US008340313B2

(12) United States Patent
Caffrey

(10) Patent No.: US 8,340,313 B2
(45) Date of Patent: Dec. 25, 2012

(54) WIRELESS DIGITAL TRANSMISSION OF LOW FREQUENCY EFFECTS AND SURROUND CHANNELS FOR SURROUND SOUND SYSTEM

(75) Inventor: John Justin Caffrey, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1547 days.

(21) Appl. No.: 10/570,065

(22) PCT Filed: Sep. 22, 2004

(86) PCT No.: PCT/US2004/030949

§ 371 (c)(1), (2), (4) Date: Mar. 1, 2006

(87) PCT Pub. No.: WO2005/032210

PCT Pub. Date: Apr. 7, 2005

(65) Prior Publication Data

US 2008/0247554 A1 Oct. 9, 2008

Related U.S. Application Data

(60) Provisional application No. 60/505,502, filed on Sep. 24, 2003.

(51) Int. Cl.

| | |
|---|---|
| ***H04B 3/00*** | (2006.01) |
| ***H04B 5/00*** | (2006.01) |
| ***H04R 5/00*** | (2006.01) |
| ***H04R 5/02*** | (2006.01) |
| ***H04H 40/00*** | (2008.01) |

(52) U.S. Cl. .............. 381/79; 381/300; 381/311; 381/1; 381/17; 381/307; 455/3.06

(58) Field of Classification Search .................. 381/1, 2, 381/17, 18, 77, 79, 80, 300–311; 455/3.06
See application file for complete search history.

(56) References Cited

U.S. PATENT DOCUMENTS

| | | | |
|---|---|---|---|
| 5,930,370 | A | 7/1999 | Ruzicka |
| 6,590,982 | B1 | 7/2003 | Chen |
| 6,608,907 | B1 | 8/2003 | Lee |

FOREIGN PATENT DOCUMENTS

| | | |
|---|---|---|
| EP | 0284286 | 3/1988 |
| EP | 1098548 | 5/2001 |

(Continued)

OTHER PUBLICATIONS

Search Report Dated Dec. 16, 2004.

*Primary Examiner* — Devona Faulk
(74) *Attorney, Agent, or Firm* — Robert D. Shedd; Reitseng Lin

(57) ABSTRACT

A subwoofer is equipped with a wireless receiver to receive signals containing information for a Low Frequency Effects (LFE) channel and information for both surround channels. In one form, the LFE is added to one or both surround channels to provide a stereo surround signal (containing both surround channels) including a multiplexed LFE channel. The subwoofer utilizes the LFE channel, powers surround speakers, and passes the surround signals to respective surround speakers. A receiver multiplexes LFE signals into either one or both surround sound audio channels. A digital RF transmitter of the receiver transmits the combined subwoofer/surround channels to the wireless receiver of the subwoofer. The remote subwoofer is connected to a power source. The surround speakers are connected to the subwoofer so as to receive the surround channels and be powered thereby.

17 Claims, 5 Drawing Sheets

FOREIGN PATENT DOCUMENTS

| | | | | |
|---|---|---|---|---|
| JP | 11-4500 | | | 1/1999 |
| JP | 2002-84600 | | | 3/2002 |
| JP | 3095209 | | | 4/2003 |
| WO | WO99/48327 | | | 9/1999 |
| WO | WO 9948327 | A1 | * | 9/1999 |
| WO | 02/065815 | A2 | | 8/2002 |

* cited by examiner

WIRELESS DIGITAL TRANSMISSION OF LOW FREQUENCY EFFECTS AND SURROUND CHANNELS FOR SURROUND SOUND SYSTEM

This application claims the benefit, under 35 U.S.C. §365 of International Application PCT/US04/30949, filed Sept. 22, 2004, which was published in accordance with PCT Article 21(2) on Apr. 7, 2005 in English. and which claims the benefit of U.S. provisional patent application No. 60/505, 502, filed Sept. 24, 2003.

BACKGROUND OF THE INVENTION

1. Field of the Invention

The present invention relates to an apparatus and method for transmitting audio information and, in particular, to an apparatus and method for wirelessly transmitting audio data to one or more speakers in a home theater system.

2. Background Information

FIG. 1 depicts a block diagram of a conventional or traditional prior art home theater or surround sound system generally designated 10. The conventional home theater or surround sound system 10 includes a home theater receiver 12 as its main component. Physically connected by wire to the receiver 12 are a right speaker 14, a left speaker 16 and a center speaker 18. The receiver 12 is operable to provide right channel audio signals to the right speaker 14, left channel audio signals to the left speaker 16, and center channel audio signals to the center speaker 18.

Also physically connected by wire to the receiver 12 are a right surround speaker 20, a left surround speaker 22, and a subwoofer 24. The receiver 12 is operable to provide right surround audio signals to the right surround speaker 20, left surround audio signals to the left surround speaker 22, and subwoofer signals to the subwoofer 24. Because all of the speakers need to be physically connected to the receiver 12, it is apparent that such home theater or surround sound systems present many challenges to the easy and/or efficient installation thereof. As such, many consumers may forego purchase of a home theater system because of installation obstacles.

Many consumers who desire home theater systems such as the system depicted in FIG. 1 encounter difficulty in wiring the surround speakers since the surround sound speakers are placed at some distance from the receiver. Such difficulty may be due to several reasons but is typically because of aesthetic concerns or logistical problems. Because of this, many consumers reluctantly forgo connecting their surround speakers, resulting in less than optimal home theater sound performance as well as consumer frustration.

In view of the above, various wireless surround sound solutions have been developed. Most wireless surround solutions utilize an "analog audio over RF" solution which, while easy and cost effective to achieve, results in poor audio quality. Since the purpose of a home theater or surround sound system is to have superior sound, such poor audio quality defeats the purpose of such a purchase. This leads to the premise of utilizing digital technologies rather than analog technologies. However, if digital technologies are used, solutions become quite expensive to implement. Moreover, unless the wireless surround sound speakers are driven by battery, wires are still needed from the home theater receiver to the surround sound speakers in order to power the surround sound speakers. The use of battery driven surround sound speakers is not an acceptable solution for obvious reasons.

For example, if the surround sound speakers include a wireless receiver and amplifier for the wireless signals, the surround sound speakers still need a power source to drive the receiver and amplifier. Alternatively, if the surround sound speakers do not include a wireless receiver and amplifier, the surround sound speakers need to connect to an external receiver/amplifier which, again, still needs a separate power supply.

Thus, even though such prior art wireless system are somewhat better than the traditional home theater systems, the prior art wireless systems are nonetheless still present installation obstacles.

It is thus evident from the above discussion that what is needed is a surround sound speaker solution that alleviates installation obstacles.

It is thus further evident from the above discussion that what is needed is wireless surround sound speaker solution that alleviates the shortcomings of the prior art.

It is thus also evident from the above that what is needed is a wireless surround sound speaker solution that provides digital sound quality.

These needs and others are accomplished through application of the principles of the subject invention and/or as embodied in one or more various forms and/or structures such as are shown and/or described herein.

SUMMARY OF THE INVENTION

In accordance with the principles of the subject invention, a subwoofer is equipped with a wireless receiver to receive signals containing information for a Low Frequency Effects (LFE) channel and information for both surround channels. The subwoofer utilizes the LFE channel information, powers surround speakers, and passes the surround channel information signals to respective surround speakers. In this manner, the subwoofer may be positioned at a remote location relative to a surround sound system receiver, such as at the rear of the room having the surround sound system. This way, no separate power wires are needed for the surround speakers while the surround speakers are remote from and not coupled to the surround sound system receiver.

According to one embodiment, LFE channel signals are digitally multiplexed into either one or both surround channels when transmitted to the subwoofer. The subwoofer demultiplexes the received signals to separate the LFE channel signals from the surround channels signals. In one implementation or form of the present invention, the multiplexed signals are converted to Red Book CD format using eight to fourteen modulation (EFM) before the signals are transmitted to the subwoofer.

In addition to the LFE channel signals being multiplexed into either one or both surround channels, bass frequency audio components may be also multiplexed into either one or both surround channels.

According to another embodiment, LFE channel signals are added to either one or both surround channels initially in analog format by the surround sound system receiver. The signals are summed and converted to pulse code modulation (PCM) format. The PCM format signals are then encoded into Red Book CD format using EFM and transmitted to the subwoofer over an RF (Radio Frequency) carrier. An RF receiver located inside or near the subwoofer then demodulates the RF EFM signals, and converts the PCM signals to analog audio.

The LFE channel can be extracted from one or both surround channels using a simple low pass filter and amplified by the subwoofer. If the LFE is extracted from both channels, the two LFE signals should be recombined using a summing amplifier. The resulting audio signal is then amplified by the subwoofer.

In one form, the subject invention provides a wireless subwoofer for use in a surround sound system. The wireless subwoofer includes a receiver for wirelessly receiving a signal including both subwoofer and surround components, and an extractor for extracting the subwoofer component from the received signal to drive the subwoofer. The subwoofer also provides appropriate right and left surround components to right and left surround speakers respectively to drive the surround speakers.

In another form, the subject invention provides a surround sound receiver. The surround sound receiver includes a first port for connecting to a first front speaker, a second port for connecting to a second front speaker, a combiner for combining signals from subwoofer and surround channels, and a transmitter for wirelessly transmitting the combined signal to a subwoofer. The subwoofer wirelessly receives the combined signal, extracts the subwoofer channel from the combined signal, powers surround speakers, and provides a signal including the surround channels to the surround speakers. The surround sound receiver preferably, but not necessarily, also includes a third port for connecting to a center speaker.

In still another form, the subject invention provides a method of driving a surround sound subsystem having a subwoofer and surround sound speakers. The method comprises the steps of: (a) combining, at a surround sound receiver, a subwoofer signal with and a surround signal; (b) wirelessly transmitting the combined signal via a digital RF transmitter associated with the surround sound receiver; (c) receiving the wirelessly transmitted combined signal with a wireless digital RF receiver associated with the subwoofer; (d) extracting the subwoofer signal from the combined signal to drive the subwoofer with the extracted subwoofer signal; and (e) providing the surround signal to the surround sound speakers connected to the subwoofer to drive the surround sound speakers with the surround signal.

BRIEF DESCRIPTION OF THE DRAWINGS

The above mentioned and other features and objects of this invention, and the manner of attaining them, will become more apparent and the invention itself will be better understood by reference to the following description of one embodiment of the invention taken in conjunction with the accompanying drawings, wherein.

Figure 1:
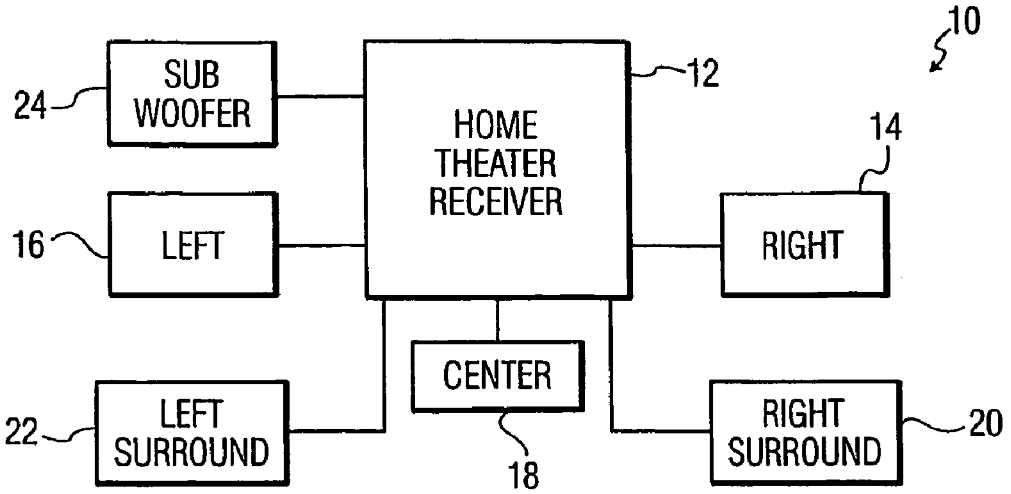
FIG. 1 PRIOR ART
FIG. 1 is a block diagram of a conventional prior art configuration of a home theater or surround sound system.

Corresponding reference characters indicate corresponding parts throughout the several views. Although the drawings represent embodiments of the invention, the drawings are not necessarily to scale and certain features may be exaggerated in order to better illustrate and explain the present invention. The exemplification set out herein illustrates one embodiment of the invention, in one form, and such exemplification is not to be construed as limiting the scope of the invention in any manner.

DETAILED DESCRIPTION

The embodiment disclosed herein is not intended to be exhaustive or limit the invention to the precise form disclosed so that others skilled in the art may utilize its teaching.

Figure 2:
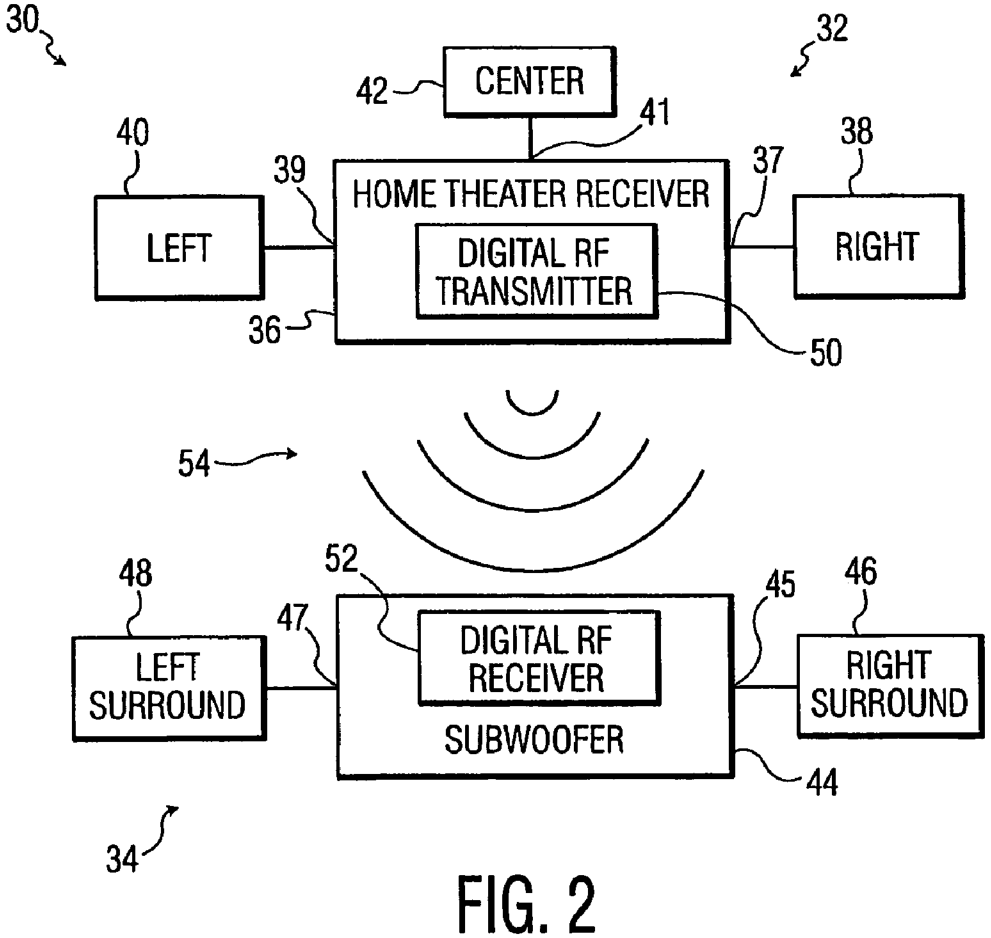
FIG. 2 is a block diagram of an exemplary home theater or surround sound system in accordance with the principles of the present invention.

FIG. 2 depicts a block diagram of a home theater system generally designated 30 embodying the principles of the present invention. The home theater system 30 has a first subsystem or portion generally designated 32 that may be termed a main subsystem or portion. The main subsystem 32 includes a home theater receiver 36 that, in addition to the function and/or operation as described herein in accordance with the present principles, functions in a manner such as is known in the art for a home theater receiver including the receipt, processing and/or distribution (collectively, processing) of audio or audio/video signals from one or more sources or inputs to one or more destinations or components. As an audio processor, the receiver 36 provides audio signals for production of audio through appropriate audio reproduction devices (e.g. speakers).

As such, the main subsystem 32 includes a right audio speaker (speaker) 38, a left audio speaker (speaker) 40 and a center audio speaker (speaker) 42. The receiver 36 includes a right channel audio output or speaker port 37 from which a right channel audio signal or signals are provided to the right speaker 38 via a wire connection as represented in FIG. 2 by the line extending between the port 37 and the speaker 38. The receiver 36 also includes a left audio channel output or speaker port 39 from which a left channel audio signal or signals are provided to the left speaker 40 via a wire connection as represented in FIG. 2 by the line extending between the port 39 and the speaker 40. The receiver 36 further includes a center channel audio output or speaker port 41 from which a center channel audio signal or signals are provided to the center speaker 42 via a wire connection represented in FIG. 2 by the line extending between the port 41 and the speaker 42. The main system 32 also includes a digital RF transmitter system 50 whose function, operation and/or features are described below. It should be understood, however, that while the digital RF transmitter 50 is shown as part of or incorporated into the receiver 36, the digital RF transmitter 50 may be external to or separate from the receiver 36.

The home theater system 32 also includes a second subsystem or portion generally designated 34 that may be termed a surround sound, surround or enhanced subwoofer subsystem or portion. The surround subsystem 34 includes a subwoofer 44, a right surround sound (surround) speaker 46 and a left surround sound (surround) speaker 48. The subwoofer includes a right surround sound (surround) channel port 45 from which a right surround sound (surround) channel audio signal or signals are provided to the right surround speaker 46 via a wire connection represented in FIG. 2 by the line extending between the port 45 and the speaker 46. The right and left surround speakers may also be termed right and left rear speakers. The subwoofer also includes a left surround sound (surround) channel port 47 from which a left surround sound (surround) channel audio signal or signals are provided to the left surround speaker 48 via a wire connection represented in FIG. 2 by the line extending between the port 47 and the speaker 48. The subwoofer system 34 also includes a digital RF receiver system 52 whose operation, function and/ or features are described below. It should be understood, however, that while the digital RF receiver 52 is shown as part of or incorporated into the subwoofer 44, the digital RF receiver 52 may be external to or separate from the subwoofer 44.

The home theater system 30 shown in FIG. 2 is known as a 5.1 system, in that there are five (5) speakers (a right and left speaker, a center speaker, and right and left surround sound speakers) and a single (1) subwoofer. It should be appreciated, however, that the present invention is applicable to other speaker system configurations such as 7.1 systems (seven speakers and a single subwoofer).

The main subsystem 32 further includes the digital radio frequency (RF) transmitter 50 that is associated with or is part of the receiver 36. The digital RF transmitter 50 is operable, configured and/or adapted to provide modulation of audio using CD format such as that to comply with the standard Red Book CD format prior to transmission. The process for converting the audio data to the Red Book CD format are well known by those skilled in the art, and may be accomplished by utilizing an SAA 7392 IC manufactured by Philips Corporation. The audio data is first converted to PCM format, wherein the signal is time sampled and amplitude quantized into a parallel binary number. This is typically accomplished in an analog to digital converter (ADC). The digital data is then processed to provide Cross-Interleaved Reed Solomon Coding (CIRC) error correction encoding and eight to fourteen modulation (EFM).

The data according to the Red Book CD format is grouped into frames, wherein each frame consists of 588 channel bits. Each frame consists of a 27 bit synchronization portion, an 8 bit SUBCODE portion (if applicable or necessary), a 96 bit data portion, a 32 bit parity portion, a second 96 bit data portion, and a second 32 bit parity portion. In assembling a frame, six 32 bit PCM audio sampling periods are grouped in a frame and each sampling frame is then divided to produce four 8 bit audio symbols. To scatter possible errors, the symbols from different frames are interleaved so that the audio signals from one frame originate from different frames. In addition, eight 8 bit parity symbols are generated for each frame, four in the middle of the frame and four at the end of the frame. The interleaving of the frames and the generation of the parity frames provides the error correction encoding based on the Cross-Interleave Reed Solomon Code. Once the frames have been assembled, the data is EFM encoded, wherein blocks of 8 bits are translated to blocks of 14 bit words using a table that assigns a particular 14 bit word to each 8 bit word. In one embodiment, the assembly of the frame, including the interleaving of the data and the EFM encoding is performed by a CD format encoder which comprises a CIRC encoder, control and display encoder, time multiplexer and EFM modulator all within the digital RF transmitter 50. It should be appreciated, however, that the above functions and processes may be implemented with other various components and software elements known to those skilled in the art. The conversion results in an EFM signal, which is then conditioned to produce the modulating signal.

Moreover, the digital RF transmitter 50 may be operational as follows. The EFM signal is frequency band limited to sinusoidal fundamentals by signal conditioning within the digital RF transmitter 50 in order to simplify the subsequent frequency modulation stage whereby the analog-like signal will frequency modulate a carrier to transmit the audio to the digital RF receiver 52. The EFM signal may be band limited such as between 180 kHz to 720 kHz. The conditioned EFM signal is used to modulate an RF carrier signal by the digital RF transmitter 50 which includes a radiator or antenna.

This scheme, however, supports stereo only. Thus, the CD format may only support two channels. In the present case, these two channels are the right surround sound audio channel and the left surround sound audio channel. In accordance with the principles of the subject invention, however, the receiver 36 through and/or via the digital RF transmitter 50, multiplexes LFE (Low Frequency Effects) channel of the surround sound system, also known as the subwoofer channel, into either one or both of the right and left surround channels. The combined audio, subwoofer system or enhanced surround sound signal or signals is provided in CD format by the digital RF transmitter 50 of the receiver 36 as described above and wirelessly transmitted to the digital RF receiver 52 of the subwoofer 44. The subwoofer 44 is operable, configured and/or adapted to receive and process the combined audio signal in order to recover the right surround sound audio channel component from the combined signal, the left surround sound audio channel component from the combined signal, and the subwoofer audio channel (LFE) component from the combined signal. The recovered right surround sound audio channel is provided to the right surround speaker 46, the recovered left surround sound audio channel is provided to the left surround speaker 48, and the subwoofer (LFE) channel is provided to the subwoofer 44. Since the subwoofer 44 is typically provided at the rear of a home theater or surround sound system, a user would have no problem in wiring the surround speakers 46 and 48.

Figure 3:
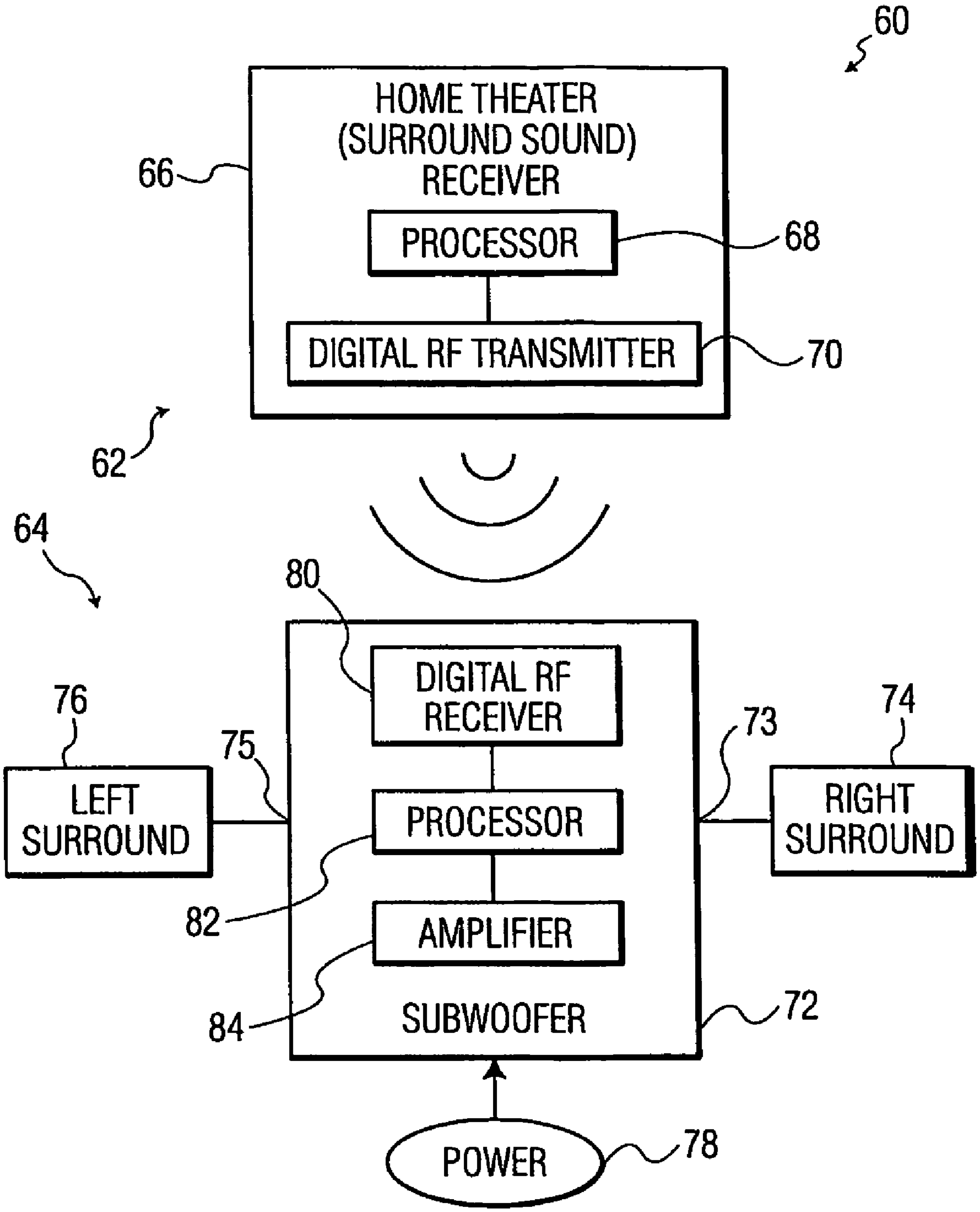
FIG. 3 is a block diagram of an embodiment of the home theater or surround sound system of FIG. 2 in accordance with the present principles.

Referring to FIG. 3, another exemplary embodiment of a home theater or surround sound system, generally designated 60 embodying the principles of the present invention, particularly those set forth above with respect to the embodiment of FIG. 2. As such, the home theater system 60 has a first subsystem or portion generally designated 62 that may be termed a main subsystem or portion, and a second subsystem or portion generally designated 64 that may be termed a surround sound, surround or enhanced subwoofer subsystem or portion. Each of the subsystems 62 and 64 function in accordance with the principles set forth above.

The main subsystem 62 includes a home theater receiver 66 having a processor 68 such as or including a digital sound processor. The processor 68 is in communication with a digital RF transmitter 70. The digital RF transmitter 70 functions in the manner set forth above with respect to the digital RF transmitter 50. The processor 68 provides the necessary processing and/or control of the receiver 66. The right, left and center speakers that would be connected to the receiver 66 are not depicted in FIG. 3 for simplicity. The digital RF transmitter 70 provides the combined surround/subwoofer signal(s) wirelessly as represented by the curved lines emanating from the digital RF transmitter 70 to the subsystem 64.

The surround subsystem 64 includes a subwoofer 72 having a right surround port 73 and a left surround port 75. A right surround speaker 74 is depicted as connected to the right surround port 73 via a wire represented by a line between the two, while a left surround speaker 76 is depicted as connected to the left surround port 75 via a wire represented by the line between the two. The subwoofer 72 is connected to a power supply or source 78 which provides power to the subwoofer which in turn provides power for/to the surround speakers 74, 76. The subwoofer 72 further includes a digital RF receiver 80, a processor 82 and an amplifier 84.

Particularly, the digital RF transmitter 70 that is associated with or is part of the receiver 66 is operable, configured and/or adapted to provide modulation of audio using CD format such as that to comply with the standard Red Book CD format prior to transmission. The process for converting the audio data to the Red Book CD format are well known by those skilled in the art, and may be accomplished by utilizing an SM 7392 IC manufactured by Philips Corporation. The audio data is first converted to PCM format, wherein the signal is time sampled and amplitude quantized into a parallel binary number. This is typically accomplished in an analog to digital converter (ADC). The digital data is then processed to provide CIRC error correction encoding and eight to fourteen modulation (EFM).

The receiver 66 through the processor 68 and via the digital RF transmitter 70, multiplexes LFE (Low Frequency Effects) channel of the surround sound system, also known as the subwoofer channel, into either one or both of the right and left surround channels. The combined audio, subwoofer system or enhanced surround sound signal or signals is provided in CD format by the digital RF transmitter 70 of the receiver 66 as described above and wirelessly transmitted to a digital RF receiver 80 of the subwoofer 72.

The subwoofer 72 is operable, configured and/or adapted to receive and process the combined audio signal via the digital RF receiver 80. The processor 82 is operable, configured and/or adapted via circuitry/logic and/or firmware to recover the right surround sound audio channel component from the combined signal, the left surround sound audio channel component from the combined signal, and the subwoofer audio channel (LFE) component from the combined signal. The recovered right surround sound audio channel is amplified by the amplifier 84 and provided to the right surround speaker 46. The recovered left surround sound audio channel is amplified by the amplifier 84 and provided to the left surround speaker 48. The subwoofer (LFE) channel may or may not be amplified by the amplifier 84 and provided to a voice coil (not shown) in the subwoofer 72 producing low frequency sounds.

Figure 4:
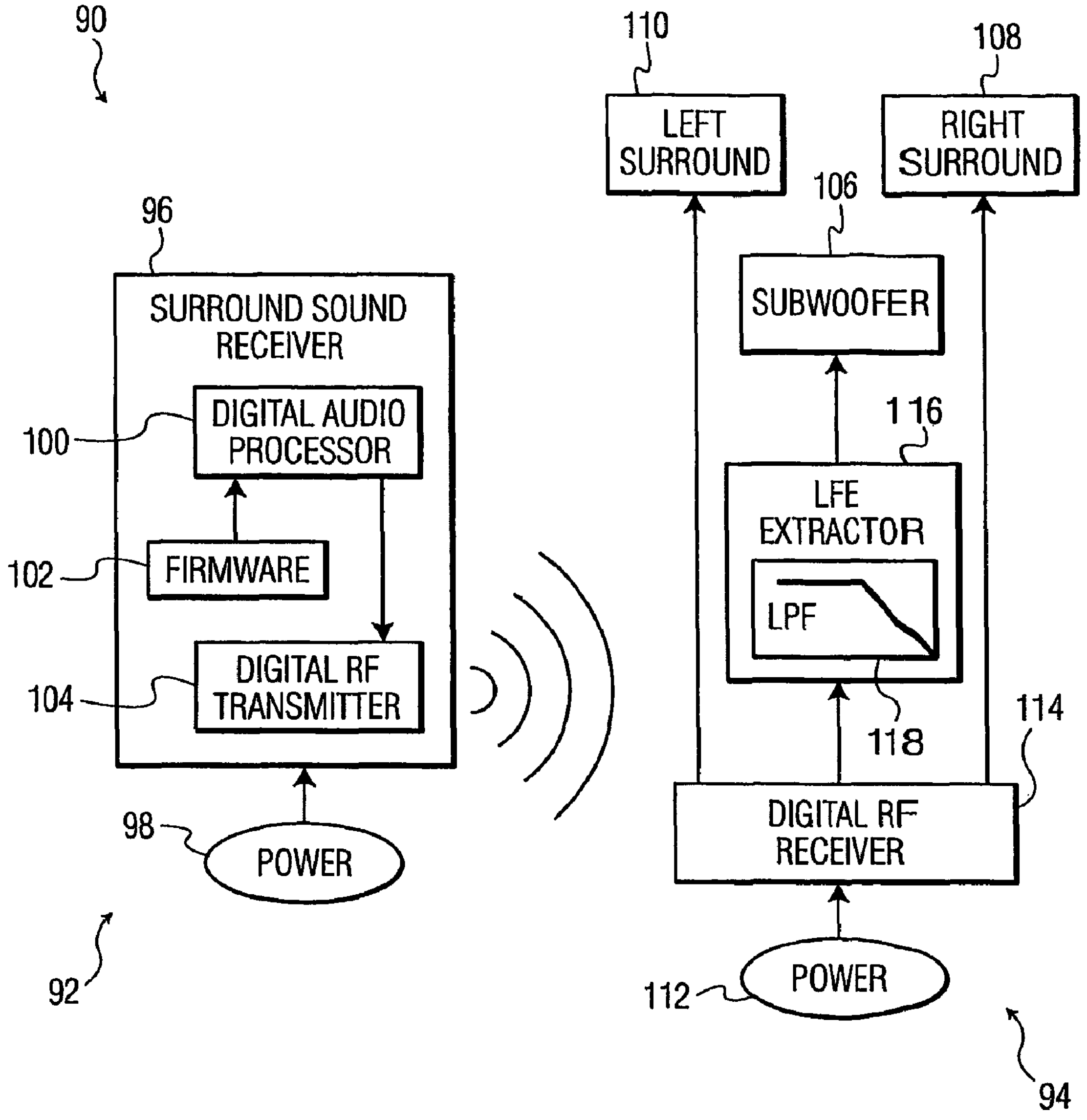
FIG. 4 is a block diagram of another embodiment of the home theater or surround sound system of FIG. 2 in accordance with the present principles.

With reference now to FIG. 4, there is depicted another embodiment of a home theater or surround sound system, generally designated 90 in accordance with the principles of the subject invention. The system 90 of FIG. 4 provides a look into a system that is typical of home theater systems in which the present invention or principles thereof may be implemented as well as providing one manner or method of accomplishing multiplexing of the LFE into the surround channels. The system 90 includes a main subsystem 92 and a surround/subwoofer subsystem 94. The main subsystem 92 includes a surround receiver 96 as a main component while the surround/subwoofer subsystem 94 includes a subwoofer 106, digital RF receiver 114 and LFE extractor 116 as its main components. Again, no speakers are shown coupled to the receiver 96 for simplicity. A right surround speaker 108 and a left surround speaker 110 are connected to the digital RF receiver 114 to receive the appropriate surround channels after processing by the digital RF receiver 114. Additionally, the receiver 96 is connected to an appropriate power source or supply 98, while the digital RF receiver 114 is connected to an appropriate power source supply 112 which provides power as necessary. Typically, this is 120 volt AC such as is standard in U.S. homes. The power supplies 98 and 112 are usually the same source, but accessed via different electrical plugs within the house.

Most home theater receivers, like receiver 96 includes a digital sound processor 100. Additionally, firmware 102 is provided to allow the digital audio processor to function or operate in the manner set forth herein. The digital sound processor 100/firmware 102 allow configuration for bass management and/or bass redirection. This allows for LFE to be added to all or some of the other five speakers (in a 5:1 system). This also allows for the lower frequency components of the audio channels to be redirected from the speakers to the subwoofer. As such, and in accordance with the principles of the present invention, the digital audio processor 100 is utilized to digitally multiplex the LFE channel onto left and right surround PCM channels. The firmware 102 is modified to allow the LFE channel to be multiplexed onto the left and/or right surround channels, rather than or in addition to the typical case where the LFE is multiplexed into the right and left channels. Additionally, since it is possible to have the bass component of audio redirected from the five speakers to the subwoofer, it is also possible to have the sound processor 100 then multiplex this bass plus LFE signal with the surround channels. Digital multiplexing may be accomplished via several options such as adding LFE to one or both surround channels, or add LFE plus bass frequency audio components to one or both surround channels. Thus, the system 90 provides digital domain processing for creating, providing and receiving the combined LFE/surround signal.

The digital RF receiver 114 is operative, configured and/or adapted to receive the wirelessly transmitted surround/subwoofer (combined) signal from the digital RF transmitter 104. The digital RF receiver 114 processes the received combined signal to retrieve the right surround channel and the left surround channel. The right surround channel is provided to the right surround speaker 108, while the left surround channel is provided to the left surround speaker 110.

The digital RF receiver 114 also provides the signal to the LFE extractor 116. The LFE extractor 116 extracts the LFE channel from one or both surround channels for use by the subwoofer. The LFE extractor 116 may include a low pass filter 118 for this purpose. The resulting extracted subwoofer channel is provided to the subwoofer 106.

Figure 5:
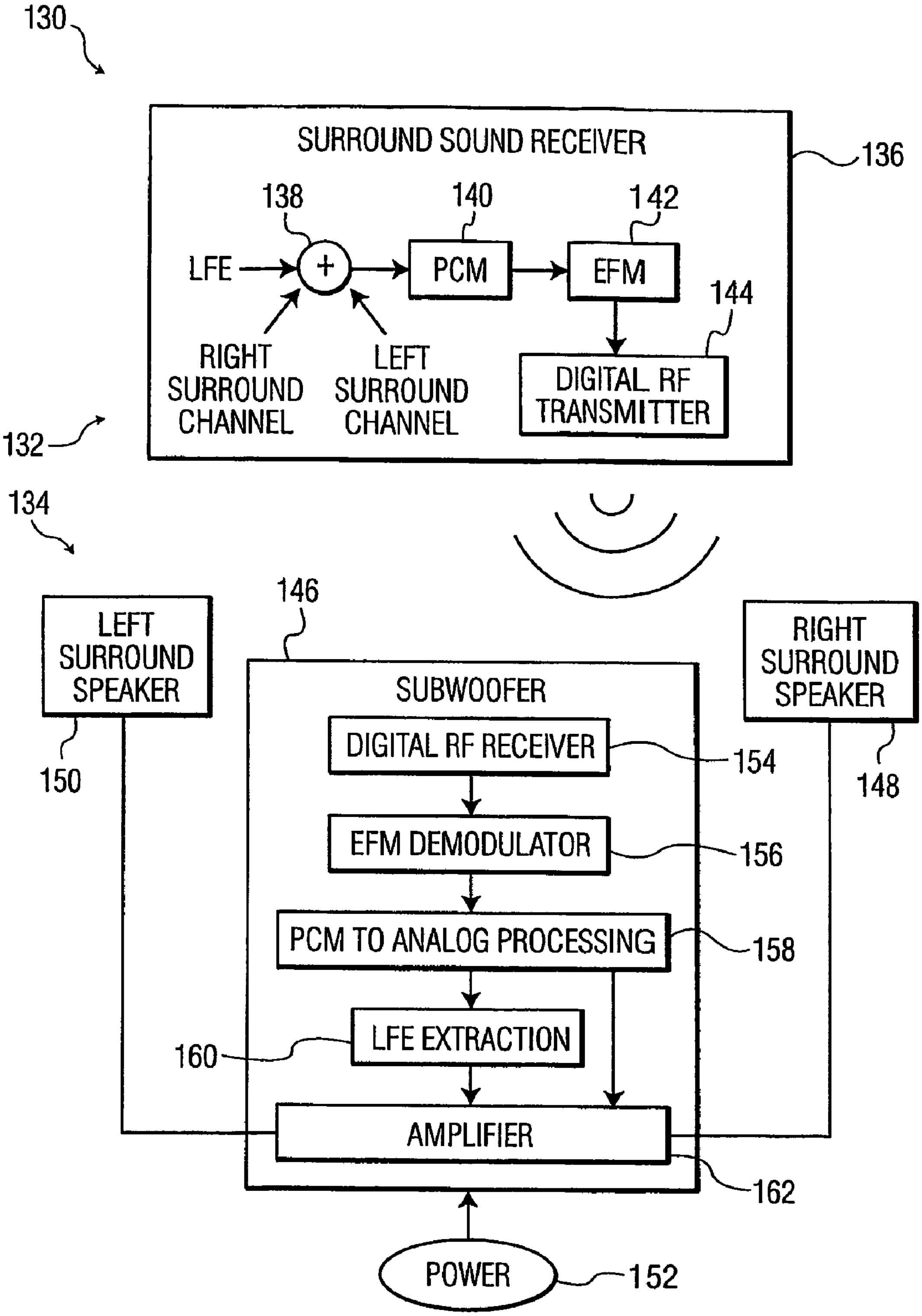
FIG. 5 is a block diagram of a further embodiment of the home theater or surround sound system of FIG. 2 in accordance with the present principles.

Referring to FIG. 5, there is depicted another exemplary embodiment of a home theater/surround sound system generally designated 130 particularly for the purpose of providing another manner of combining the LFE audio component/signal with one or both surround audio component(s)/signal(s). The system 130 includes a main subsystem 132 and a subwoofer/surround subsystem 134. The main subsystem 132 includes a receiver 136 having a digital RF transmitter 144 in the same or similar manner to those described above. No speakers are shown connected to the receiver 136 nor are power shown for simplicity. The subwoofer/surround subsystem 134 includes a subwoofer 146, a right surround speaker 148 and a left surround speaker 150. Power 152 is provided to the subwoofer 146.

In the system 130, the LFE is summed in the analog domain with one or both the right and left surround channels, then encode the resulting stereo channels digitally for digital transmission by the digital RF transmitter 144. Particularly, the LFE, the right surround channel and/or the left surround channel are summed in a summer 138. Thereafter, the summed signal is provided to a PCM 140. The resulting stereo digital PCM signal is then encoded using an EFM modulator 142, then transmitted over an RF carrier by the transmitter 144, the wireless signal represented by the curved lines.

An RF receiver 154 in or associated with the subwoofer 146 receives the combined signal. An EFM demodulator 156 then demodulates the RF EFM signal. A PCM to analog processor/processing circuitry 158 then converts the stereo PCM signal to analog audio. The analog audio signal contains the LFE channel in one or both of the surround channels. The PCM to analog processor/processing circuitry 158 provides the surround channels to an amplifier 162 which, in turn, provides the right surround channel to the right surround speaker 148 and the left surround channel to the left surround speaker 150. The PCM to analog processor/processing 158 further provides the signal to the LFE extractor/extraction circuitry 160 which extracts the LFE channel from one or both stereo surround channels such as via a low pass filter. Thereafter, the LFE signal is amplified by the amplifier 162 for use by the subwoofer. If the LFE is extracted from both surround channels, the two LFE signals should then be recombined using a summing amplifier, and then amplified by the subwoofer.

Alternatively, the LFE component may also be removed from the surround channels using simple high pass filters. In some cases (if LFE signal would damage surround speakers), it may be advantageous to remove the LFE component. In other cases (where surround speakers can handle the LFE component, or where surround speakers filter out the LFE component), it may not be necessary to high pass filter the LFE component.

Figure 6:
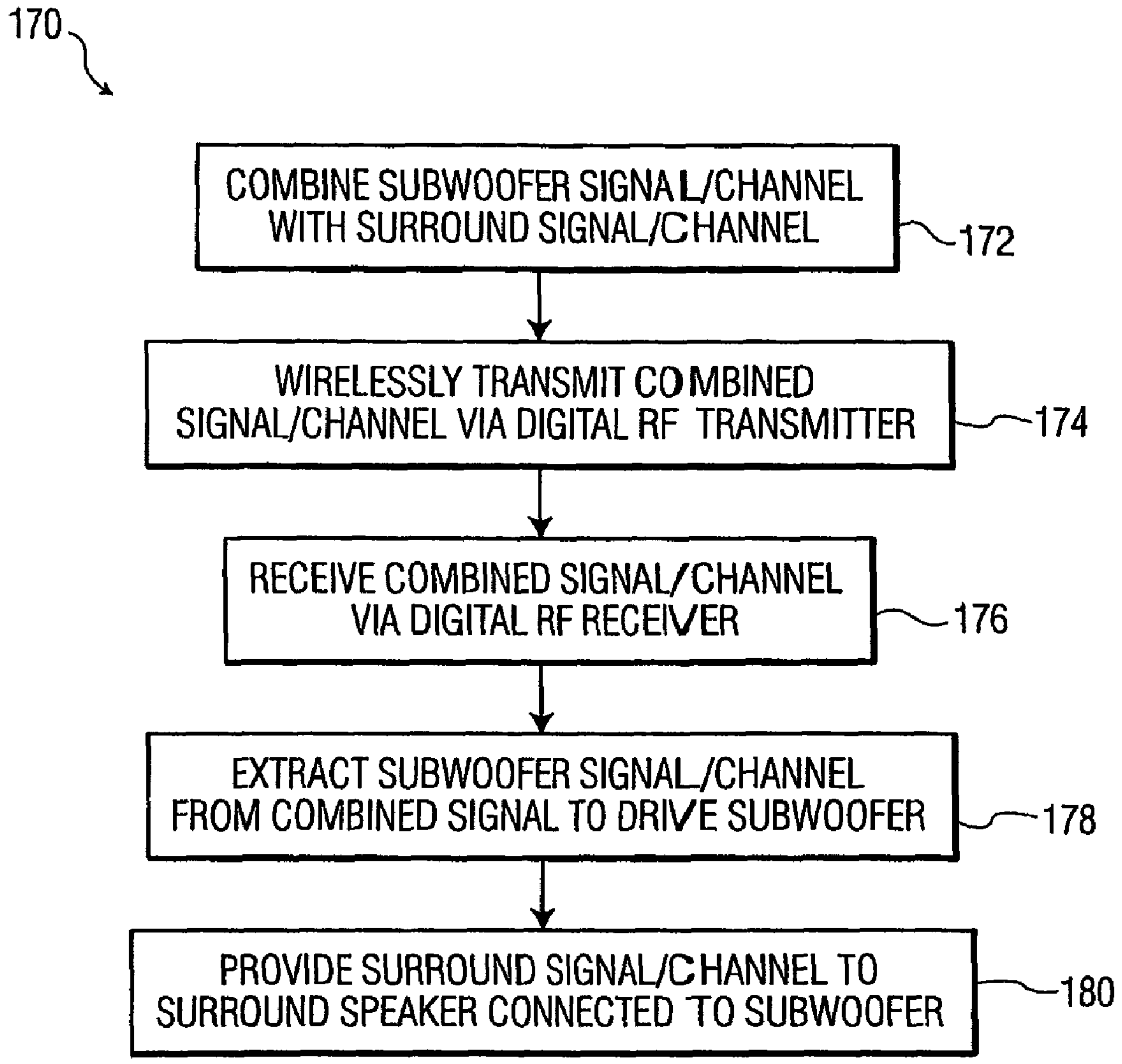
FIG. 6 is a flowchart of an exemplary manner of overall operation of the present invention.

Referring to FIG. 6, there is depicted a flowchart, generally designated 170, depicting an exemplary manner of operation of the present invention. In step 172, the subwoofer (e.g. LFE) signal/channel is combined with one or both surround signals/channels. This is accomplished in various manners as described above within the receiver. In step 174, the combined signal is then wirelessly transmitted via a digital RF transmitter associated with the receiver. In step 176, the combined signal is wirelessly received by a digital RF receiver associated with the subwoofer. In step 178, the subwoofer extracts the subwoofer signal/channel from the combined signal to drive the subwoofer with the extracted subwoofer signal/channel. The extraction depends on how the signals/channels were combined. Lastly, in step 180, the surround signal(s)/channel(s) is provided to one or both (i.e. right and/or left) surround speaker that is or are connected to the subwoofer.

It should be appreciated that the flowchart 170 described above and depicted in FIG. 6 provides a manner of exemplary operation of the subject invention as described herein. The subject invention may be implemented utilizing less or different steps than all of the steps of the flowchart 170. This may be reflected in the claims. Moreover, more or less steps in alternative embodiments of the procedure, method or operation 170 may implement the subject invention in accordance with the principles recited herein. As well, subsets of the above procedure 150 may implement the principles of the subject invention rather than the entire procedure. Variations are also contemplated.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A surround sound system comprising:

a main subsystem, wherein the main subsystem comprises a digital sound processor and a firmware, the firmware being external to the digital signal processor and allowing the digital sound processor to produce a signal including a subwoofer component and surround components that are digitally multiplexed with each other and encoded to a predefined format and allowing for the subwoofer component to be added to some or all speakers in the surround sound system, the subwoofer component comprising one or both of low frequency effects and bass frequency audio components; and a wireless subwoofer apparatus, the wireless subwoofer apparatus comprising:

a subwoofer;

a receiver for wirelessly receiving from the main subsystem the multiplexed and encoded signal; and an extractor for extracting the subwoofer component from the received signal to drive the subwoofer;

wherein the wireless subwoofer apparatus provides the surround components to drive right and left surround speakers that are different from a main set of center, right and left speakers directly coupled to and driven by the main subsystem.

2. The wireless subwoofer apparatus of claim 1, wherein the subwoofer component comprises a low frequency effects component.

3. The system of claim 1, wherein the predefined format uses eight to fourteen modulation.

4. The system of claim 1, wherein the extractor includes a digital demultiplexer operative to digitally demultiplex the subwoofer component which has been digitally multiplexed with the surround components from the received signal.

5. In a surround sound system having a main subsystem and a wireless subwoofer apparatus, the wireless subwoofer apparatus comprising:

a receiver wirelessly receiving from the main subsystem a signal including a subwoofer component and surround components wherein the subwoofer component has been summed with the surround components, converted to a pulse code modulation format and encoded into a predefined format using eight to fourteen modulation, at the main subsystem; and an extractor extracting the subwoofer component from the received signal by demodulating the eight to fourteen modulation signals to derive pulse code modulation signals, and converting the derived pulse code modulation signals to analog subwoofer signals and analog surround signals to respectively drive a subwoofer and right and left surround speakers different from a main set of center, right and left speakers directly coupled to and driven by the main subsystem, wherein the subwoofer component comprises one or both of low frequency effects and bass frequency audio components and wherein the main subsystem comprises a digital sound processor and a firmware, the firmware being external to the digital signal processor and allowing the digital sound processor to produce the received signal and allowing for the subwoofer component to be added to some or all speakers in the surround sound system.

6. The wireless subwoofer apparatus of claim 5, wherein the extractor further includes a low pass filter for filtering out the subwoofer component, and the wireless subwoofer apparatus further comprises an amplifier for amplifying the analog subwoofer and surround signals.

7. A surround sound receiver, comprising:

a first port for connecting to a main right speaker;

a second port for connecting to a main left speaker;

a third port for connecting to a main center speaker;

a digital sound processor driven by an external firmware for combining signals from subwoofer and surround channels to generate a combined signal and adding signals from the subwoofer channel to some or all the speakers, the signals from the subwoofer channel comprising one or both of low frequency effects and bass frequency audio components; and a transmitter for wirelessly transmitting the combined signal to a wireless subwoofer apparatus;

wherein the wireless subwoofer apparatus wirelessly receives the combined signal, extracts the signals from the subwoofer channel from the combined signal, powers first and second surround speakers different from the main right, main left and main center speakers, and provides a signal including the surround channels to the first and second surround speakers.

8. The surround sound receiver of claim 7, wherein the digital sound processor comprises:

a digital multiplexer for digitally multiplexing signals from the subwoofer and surround channels.

9. The surround sound receiver of claim 7, wherein the digital sound processor combines signals from the subwoofer and surround channels that are digitally multiplexed with one another and encoded to a predefined format using eight to fourteen modulation.

10. The surround sound receiver of claim 7, wherein the digital sound processor combines signals from the subwoofer and surround channels that have been summed, converted to a pulse code modulation format and encoded into a predefined format using eight to fourteen modulation.

11. A method of operating a surround sound subsystem having a subwoofer apparatus and right and left surround sound speakers, the method comprising steps of:

combining, by a digital sound processor driven by an external firmware at a surround sound receiver, a subwoofer signal with surround signals to generate a combined signal, wherein the subwoofer signal comprises one or both of low frequency effects and bass frequency audio components;

adding the subwoofer signal to some or all of the speakers by the digital sound processor;

wirelessly transmitting the combined signal via a digital RF transmitter associated with the surround sound receiver;

receiving the wirelessly transmitted combined signal with a wireless digital RF receiver associated with the subwoofer apparatus; and providing the surround signals, by the subwoofer apparatus, to drive the right and left surround sound speakers which are different from a main set of center, right and left speakers directly coupled to and driven by the surround sound receiver.

12. The method of claim 11, wherein the combining step includes digitally multiplexing the subwoofer signal with the surround signals.

13. The method of claim 12, wherein the combining step further includes converting the digitally multiplexed signals into a predefined format using eight to fourteen modulation.

14. The method of claim 12, further comprising the step of extracting the subwoofer signal from the combined signal to drive a subwoofer with the extracted subwoofer signal.

15. The method of claim 14, wherein the extracting step includes demultiplexing the subwoofer signal from the surround signals.

16. The method of claim 11, wherein the combining step includes:

summing the subwoofer signal with the surround signals in analog format;

converting the summed signals to a pulse code modulation format; and encoding the pulse code modulation format signal using eight to fourteen modulation.

17. The method of claim 16, wherein the extracting step includes:

demodulating the eight to fourteen modulation signal to obtain pulse code modulation signals; and converting the pulse code modulation signals to analog audio.

* * * * *